UNITED STATES PATENT OFFICE.

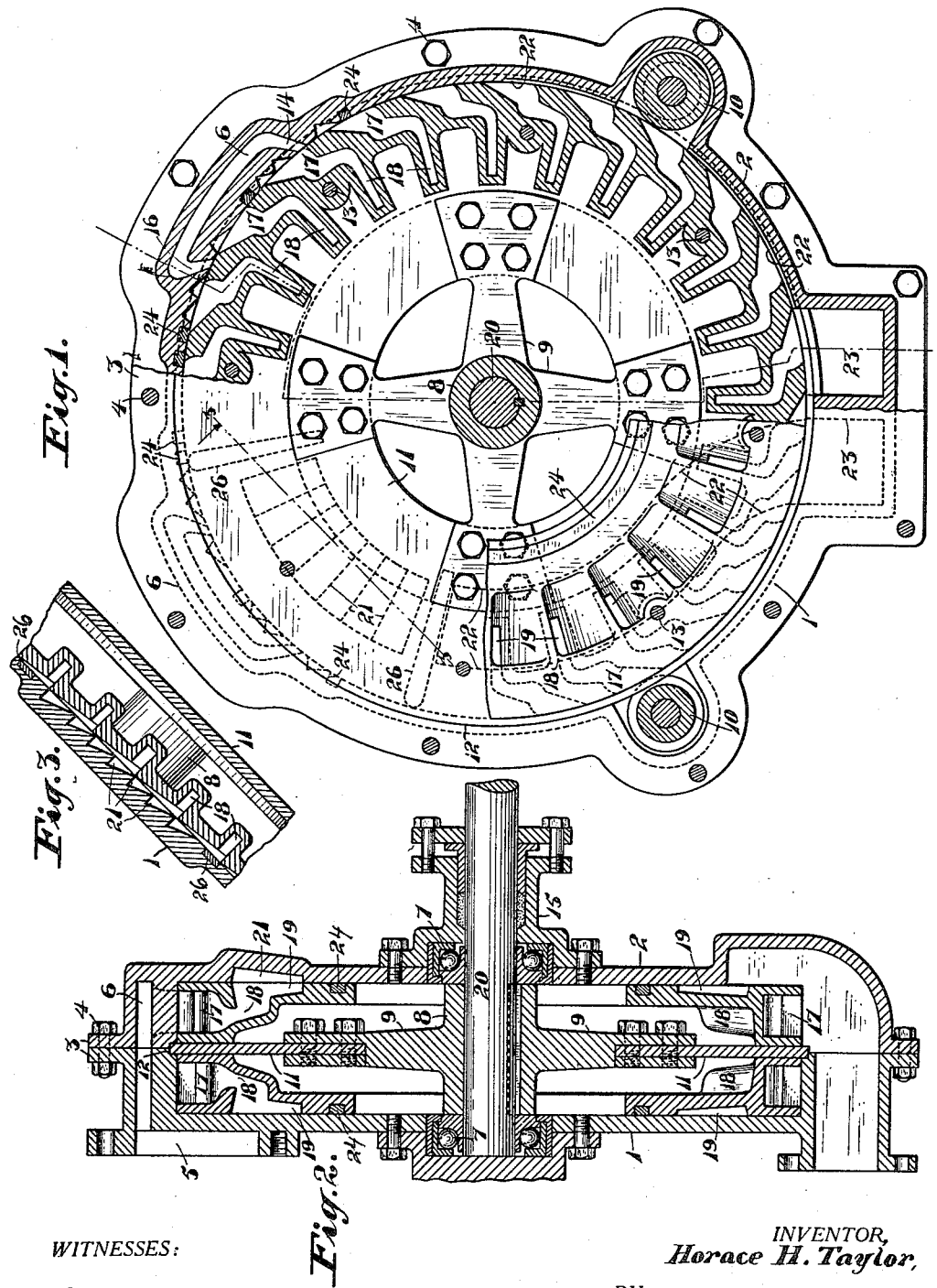

HORACE H. TAYLOR, OF OAKLAND, CALIFORNIA.

ROTARY ENGINE.

1,127,111.  Specification of Letters Patent.  Patented Feb. 2, 1915.

Application filed March 3, 1914. Serial No. 822,136.

*To all whom it may concern:*

Be it known that I, HORACE H. TAYLOR, a citizen of the United States, residing at Oakland, in the county of Alameda and State of California, have invented new and useful Improvements in Rotary Engines, of which the following is a specification.

The object of the present invention is to provide an improved rotary engine adapted to be rotated by the impact and pressure of a pressure fluid.

In the accompanying drawing, Figure 1 is a broken side view of the engine; Fig. 2 is an axial section thereof; Fig. 3 is a detail section on the line 3—3 of Fig. 1.

On referring to the drawing, it will be seen that the casing or shell of my improved engine consists of two parts 1, 2, having central flanges 3, which can be connected by bolts 4. The pressure fluid is admitted by an inlet conduit 5 connecting, through suitably controlled inlet valves, with either of two conduits 6, formed in the periphery of the casing, the two conduits being selectively used according to the direction of rotation desired. The rotor comprises a shaft 20 having ball-bearings 7 in the sides of the shell or casing, a hub 8 keyed to the shaft, spokes 9 extending from said hub, an annular steel disk 11 secured by bolts to said spokes, a marginal portion of which disk rotates in a groove 12 formed in the meeting portions of the two sections 1, 2, of the casing, thus cutting off the flow of the fluid between the two halves of the rotor and two rotor sections, the outer portions of which are secured to said disk by bolts 13, said rotor sections constituting in effect two rotors adapted to respectively communicate with the two conduits 6 and to propel the shaft in opposite directions. A description of either rotor will thus suffice for the other. Said rotor is also supported upon two rollers 10, the shaft of each of which has bearings in boxes 15 in the casing of the engine, so that the friction of the rotor is reduced to a minimum.

From either of said conduits the pressure fluid passes by one or the other (according to the position of the rotor) of front and rear oblique ports 14, 16, and enters one of a circular series of ingress ports 17 in the outer periphery of the rotor. The two ports 14, 16, are so arranged relatively to the ingress ports of the rotor that the force of impact is being constantly applied, as seen by referring to Fig. 1 of the drawing. It then impinges against a transverse abutment 17, and then flows inwardly in the rotor by a conduit 18, and passes out at the inner end of said conduit in a transverse direction by an oulet 19, being given an oblique rearward direction and impinging against one of a circular series of walls 21 in the casing, finally escaping by a passage 22 into an exhaust conduit 23.

Metal packing 26 in the inner surface of the periphery of the casing, prevents the pressure fluid from passing around the periphery, while two packing rings 24, one on each side of the rotor, lie against the side of the casing and prevent pressure fluid passing from the outer to the inner portion of said side.

I claim:—

1. In a rotary engine, a rotor having ingress ports formed with transverse abutments to receive the impact of the pressure fluid and leading from said abutment inwardly or toward the center of the rotor, then in a direction parallel with the axis, and then being directed obliquely outward and rearward.

2. In a rotary engine, a rotor having ingress ports formed with transverse abutments to receive the impact of the pressure fluid and leading from said abutment inwardly or toward the center of the rotor, then in a direction parallel with the axis, and then being directed obliquely outward and rearward, the casing having abutments against which the pressure fluid presses in its outward flow.

3. In a rotary engine, a rotor having ingress ports formed with transverse abutments to receive the impact of the pressure fluid, and formed with two halves, and an interposed disk rotating in a groove in the periphery of the casing to act as a packing ring.

In testimony whereof I have hereunto set my hand in the presence of two subscribing witnesses.

HORACE H. TAYLOR.

Witnesses:
FRANCIS M. WRIGHT,
D. B. RICHARDS.

Copies of this patent may be obtained for five cents each, by addressing the "Commissioner of Patents, Washington, D. C."